United States Patent
Cousins et al.

(10) Patent No.: US 9,322,381 B2
(45) Date of Patent: Apr. 26, 2016

(54) REMOTE START FOR MANUAL TRANSMISSIONS

(71) Applicant: GM Global Technology Operations LLC, Detroit, MI (US)

(72) Inventors: William L. Cousins, Ortonville, MI (US); Bradford W. Bur, Clarkston, MI (US)

(73) Assignee: GM Global Technology Operations Inc., Detroit, MI (US)

(*) Notice: Subject to any disclaimer, the term of this patent is extended or adjusted under 35 U.S.C. 154(b) by 0 days.

(21) Appl. No.: 13/788,787

(22) Filed: Mar. 7, 2013

(65) Prior Publication Data

US 2014/0256509 A1    Sep. 11, 2014

Related U.S. Application Data

(63) Continuation-in-part of application No. 13/284,233, filed on Oct. 28, 2011, now Pat. No. 8,739,647.

(51) Int. Cl.
| | |
|---|---|
| *F02N 11/08* | (2006.01) |
| *F02N 11/10* | (2006.01) |
| *B60W 10/18* | (2012.01) |
| *F16H 59/68* | (2006.01) |
| *F02N 99/00* | (2010.01) |
| *B60W 10/06* | (2006.01) |
| *B60W 10/11* | (2012.01) |

(52) U.S. Cl.
CPC .............. *F02N 99/00* (2013.01); *B60W 10/06* (2013.01); *B60W 10/11* (2013.01); *B60W 10/182* (2013.01); *F02N 11/0807* (2013.01); *F02N 11/103* (2013.01); *F02N 2200/0802* (2013.01); *F02N 2200/0803* (2013.01); *F16H 2059/6823* (2013.01); *Y10T 477/644* (2015.01); *Y10T 477/656* (2015.01)

(58) Field of Classification Search
None
See application file for complete search history.

(56) References Cited

U.S. PATENT DOCUMENTS

| 2,632,120 | A | * | 3/1953 | Gelbmann | 290/38 R |
|---|---|---|---|---|---|
| 3,657,720 | A | | 4/1972 | Avdenko et al. | |
| 5,646,457 | A | * | 7/1997 | Vakavtchiev | 307/10.6 |
| 6,791,202 | B2 | | 9/2004 | McCullough | |
| 6,853,895 | B2 | | 2/2005 | Javaherian | |
| 7,532,959 | B2 | * | 5/2009 | Ochs et al. | 701/2 |
| 7,647,908 | B1 | | 1/2010 | Biondo et al. | |
| 2004/0097329 | A1 | * | 5/2004 | Chang | 477/99 |
| 2004/0104719 | A1 | * | 6/2004 | Johnson et al. | 324/207.21 |
| 2004/0178050 | A1 | * | 9/2004 | Wylde | 200/61.88 |

(Continued)

FOREIGN PATENT DOCUMENTS

DE    102007057216 A1    6/2009

*Primary Examiner* — Mark Manley

(57) ABSTRACT

A remote start vehicle system for a vehicle is provided. The system includes a remote start requester configured to request that the engine be started. The remote start requester is operable to request that the engine be started when the remote start requester is located outside of the vehicle. A control module is configured to cause the engine to be started upon request from the remote start requester. A sensor assembly is configured to sense a neutral gear state of the transmission, where the neutral gear state indicates whether the transmission is in neutral. The sensor assembly is configured to communicate the neutral gear state to the control module. The control module is configured to prevent the engine from being started if the neutral gear state indicates that the transmission is not in neutral. A method of remotely starting an engine is also provided.

14 Claims, 6 Drawing Sheets

(56) References Cited

U.S. PATENT DOCUMENTS

| | | | |
|---|---|---|---|
| 2008/0074104 A1* | 3/2008 | Sauer et al. | 324/207.22 |
| 2008/0078604 A1* | 4/2008 | Ersoy et al. | 180/336 |
| 2010/0212981 A1 | 8/2010 | Roos et al. | |
| 2011/0224843 A1 | 9/2011 | Kalhous et al. | |
| 2012/0152049 A1 | 6/2012 | Benson et al. | |

* cited by examiner

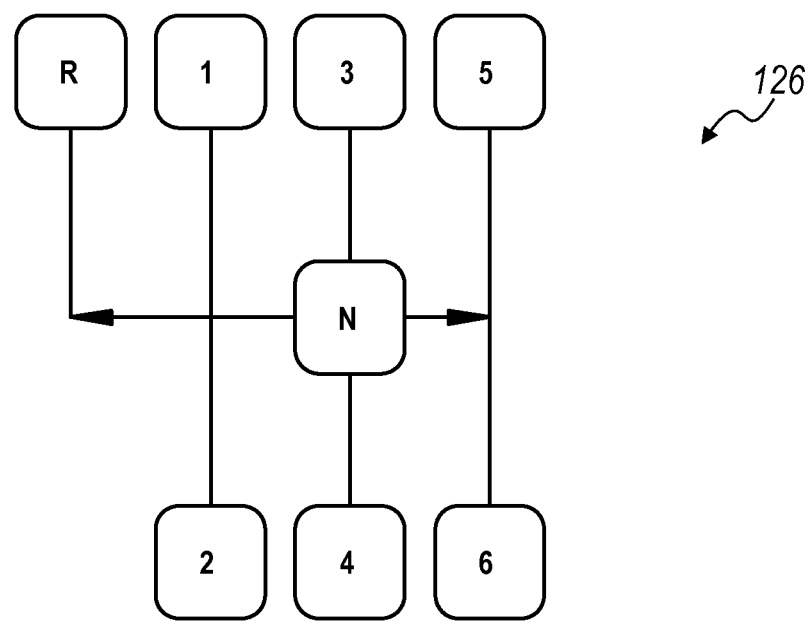
FIG. 6
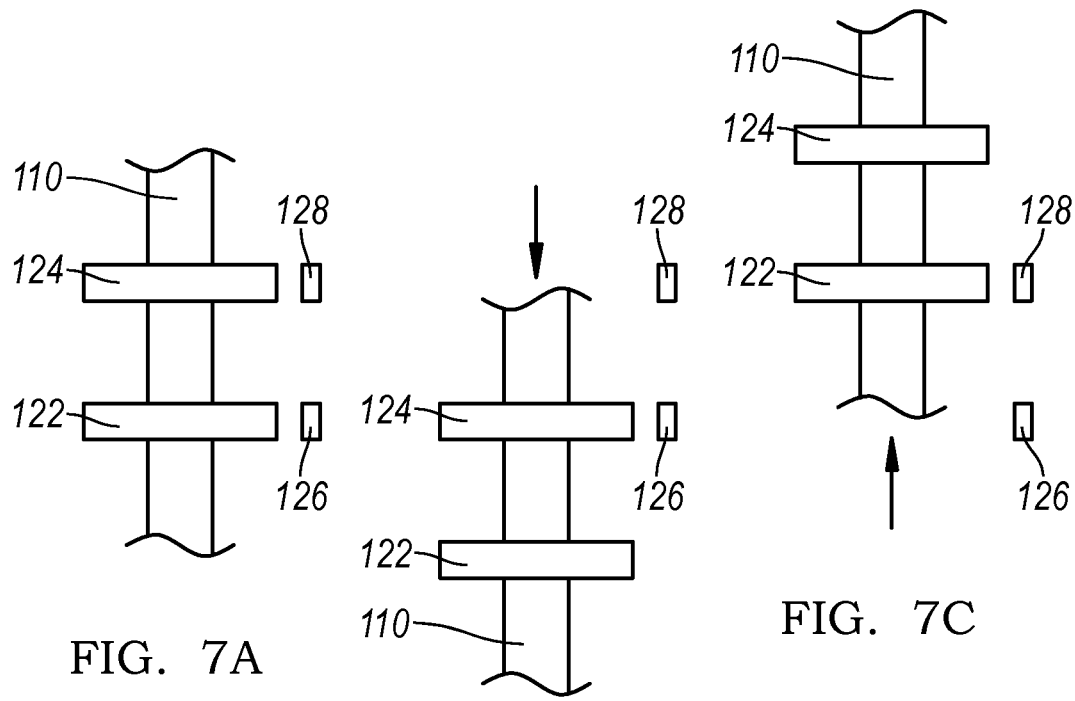
FIG. 7A
FIG. 7B
FIG. 7C

| | | SHAFT (110) POSITION | | | |
|---|---|---|---|---|---|
| | | ROTATION (FROM REAR) | | TRANSLATION | |
| | | CLOCKWISE (deg.) | COUNTER CLOCKWISE (deg.) | FORWARD (mm) | REVERSE (mm) |
| GEAR POSITION (FIG 4) | NEUTRAL | 6.5/8.0 | 13.0/14.5 | 0 | 0 |
| | REVERSE | | 13.0/14.5 | | 8.1/9.4 |
| | 1ST | | 6.5/8.4 | | 8.1/9.4 |
| | 2ND | | 6.5/8.4 | 8.18/9.32 | |
| | 3RD | 0 | 0 | | 8.1/9.4 |
| | 4TH | 0 | 0 | 8.18/9.32 | |
| | 5TH | 6.5/8.0 | | | 8.1/9.4 |
| | 6TH | 6.5/8.0 | | 8.18/9.32 | |

REMOTE START FOR MANUAL TRANSMISSIONS

FIELD

The present disclosure relates to a system and method for starting a vehicle engine remotely, and more particularly, a remote start system and method for use with a vehicle having a manual transmission, an automated manual transmission (AMT), or a dual clutch transmission (DCT).

BACKGROUND

The statements in this section merely provide background information related to the present disclosure and may or may not constitute prior art.

Certain vehicles today include remote start systems and algorithms that enable a user of the vehicle to remotely start an engine of the vehicle. Such a remote start of the engine may be desired, for example, if the user wishes to have the vehicle's interior heated or cooled before the user enters the vehicle.

However, historically, vehicle manufacturers have been unable to provide a remote start feature for a vehicle that is equipped with a manual transmission due to the inherent risk associated with the inability to ensure that the transmission is in the neutral position. Furthermore, there is also some inherent danger in starting an engine of a vehicle having a manual transmission because the vehicle could begin to move if the parking brake is not engaged. Accordingly, remote start systems were provided for automatic transmission vehicles only.

Therefore, there exists a need for vehicles having manual transmissions to include remote start features for starting the engines of such vehicles from remote locations.

SUMMARY

The present disclosure provides a system and method for remotely starting an engine of a vehicle having a manual transmission, an automated manual transmission (AMT), or a dual clutch transmission (DCT).

In one aspect, which may be combined with or separate from the other aspects described herein, a remote start vehicle system for a vehicle having a manual transmission, an automated manual transmission (AMT), or a dual clutch transmission (DCT) is provided. The remote start vehicle system includes a remote start requester configured to request that the engine of the vehicle be started. The remote start requester is operable to request that the vehicle engine be started when the remote start requester is located outside of the vehicle. A control module is included and is configured to cause the vehicle engine to be started. A sensor assembly is also included and is configured to sense a neutral gear state of the transmission, where the neutral gear state indicates whether the transmission is in neutral. The sensor assembly is configured to communicate the neutral gear state to the control module. The control module is configured to cause the engine to be started upon the request of the remote start requester if the transmission is in neutral. The control module is further configured to prevent the engine from being started if the transmission is not in neutral.

In another aspect of the present disclosure, which may be combined with or separate from the other aspects described herein, a vehicle system is provided that includes a transmission, a control module, a sensor assembly, and a remote start request transmitter. The transmission may be a manual transmission, an automated manual transmission (AMT), or a dual clutch transmission (DCT), by way of example. The transmission is configured to regulate torque transmission from an engine, and the transmission is configured to be shifted into a plurality of gear states by a user. The control module is configured to cause the engine to be started. The sensor assembly is configured to sense a neutral gear state of the transmission, where the neutral gear state indicates whether the transmission is in neutral. The sensor assembly is configured to communicate the neutral gear state to the control module. The remote start request transmitter is configured to request that the vehicle engine be started when the remote start request transmitter is located outside of the vehicle. The control module is configured to cause the engine to be started upon the request of the remote start requester if the transmission is in neutral, and the control module is further configured to prevent the engine from being started if the transmission is not in neutral.

In yet another aspect, which may be combined with or separate from the other aspects described herein, a method of remotely starting an engine of a motor vehicle is provided. The method includes receiving a remote start signal requesting that the vehicle engine be started and determining whether the transmission is in neutral. If the transmission is not in neutral, the method includes preventing the vehicle engine from being started. If the vehicle engine is not prevented from being started, the method includes starting the vehicle engine.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a plan view of a typical and representative six speed manual transmission shift gate ("H") pattern, in accordance with the principles of the present disclosure;

FIGS. 7A, 7B and 7C are diagrammatic views of the gear shift linkage and sensors in neutral, a forward gate position for odd numbered gears and a rearward gate position for even numbered gears, respectively, according to the principles of the present disclosure;

Figures 8, 9A:
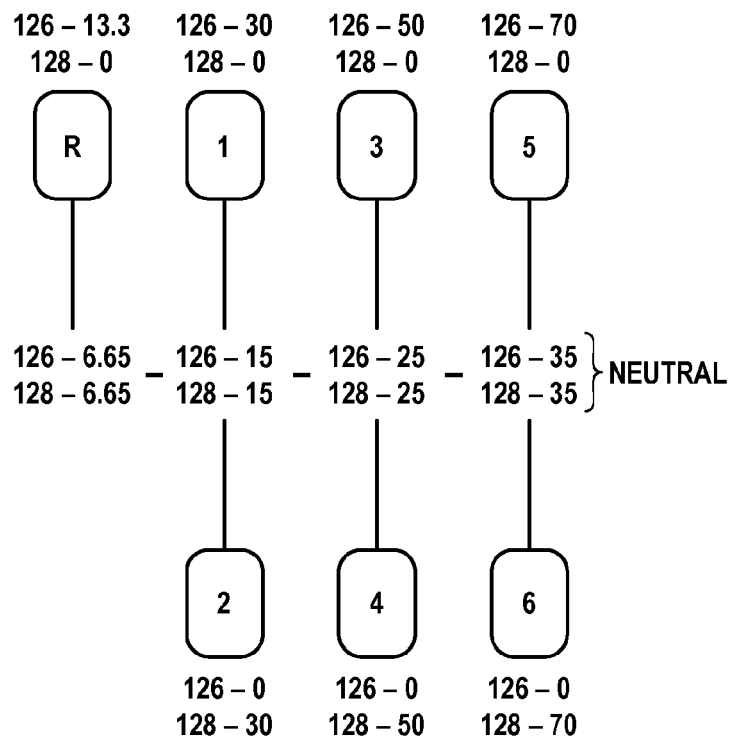
FIG. 8 is a chart presenting exemplary rotations and translations of the shift linkage of FIG. 5 associated with engaging the six forward speeds or gear ratios and reverse of the manual transmission illustrated in FIG. 4, in accordance with the principles of the present disclosure.
Figure 9B:
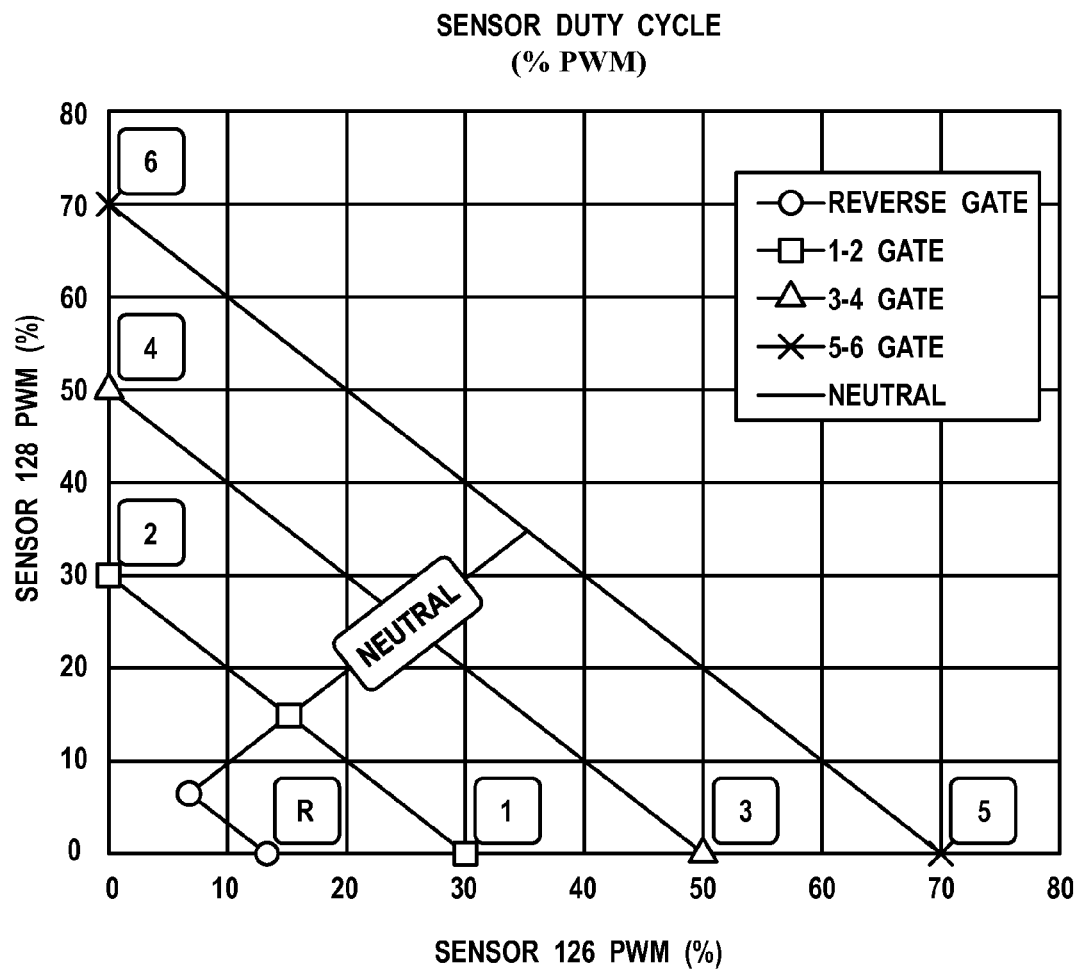

FIG. 9A is a diagram graphically illustrating the various positions of the shift linkage and the duty cycles (% PWM) of the two sensors corresponding to such positions, according to the principles of the present disclosure; and FIG. 9B is a graph illustrating the sensor duty cycle (% PWM) of the two sensors for various positions of the shift linkage, in accordance with the principles of the present disclosure.

DETAILED DESCRIPTION

The following description is merely exemplary in nature and is not intended to limit the present disclosure, application, or uses.

Figure 1:
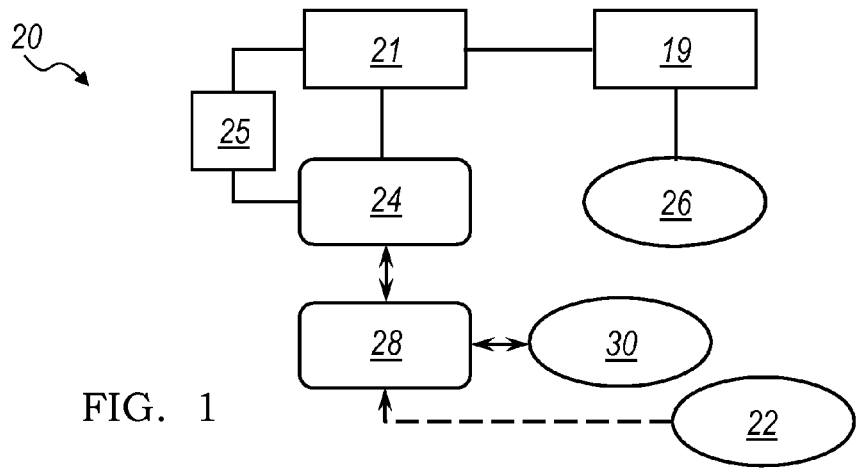
FIG. 1 is a block diagram illustrating a remote start vehicle system for a vehicle, in accordance with the principles of the present disclosure.

Referring to FIG. 1, a remote start vehicle system for a vehicle having a transmission 19 is provided and generally designated at 20. The transmission 19 may be manual transmission that is manually shifted by the vehicle operator. The transmission 19 may be a manual transmission, an automated manual transmission (AMT), or a dual clutch transmission (DCT), by way of example. The transmission 19 is configured to regulate torque transmission from an engine 21, and the transmission 19 is configured to be shifted into a plurality of gear states by the operator.

The remote start vehicle system 20 includes a remote start requester, such as a wireless transmitter 22, that is activated by a user. The remote start transmitter 22 is operable to request that the engine 21 of the vehicle be started when the remote start transmitter 22 is located outside of the vehicle. In other words, a user is able to activate the remote start transmitter 22 with a key fob, or other device, to start the vehicle engine 21 from a driveway, parking lot, or nearby building, by way of example.

A control module, such as an engine control module (ECM) 24, is configured to cause the engine 21 of the vehicle to be started. For example, the engine control module 24 communicates with a starter motor 25 to start the engine. In such a case, the engine control module 24 may be configured to send a vehicle start-up command to the starter motor 25 if the transmission 19 is in neutral (as explained in further detail below).

When the engine control module 24 receives a request to start the vehicle engine 21 from the remote start transmitter 22 (or from another controller or control module in communication with the remote start transmitter 22), the engine control module 24 starts the engine 21 of the vehicle, unless other factors prevent it from doing so (such as the transmission 19 not being in neutral or the parking brake not being applied), as explained in further detail below.

A sensor assembly 26 is configured to sense a neutral gear state of the transmission 19. The neutral gear state indicates whether the transmission 19 is in neutral. For example, the neutral gear state could include information about the gear that the transmission 19 is in, which could include neutral, at least one reverse gear, or any number of different forward gear speeds; or the neutral gear state may refer to simply whether the transmission 19 is in neutral or not. (If not, the transmission 19 is in a reverse or forward gear). The sensor assembly 26 is configured to communicate the neutral gear state to the engine control module 24. The sensor assembly 26 may include a neutral gear sensor (NGS) and/or a gear absolute position (GAP) sensor, by way of example. Additional details of the sensor assembly 26 for sensing the neutral gear state are explained in further detail below.

In some forms, the sensor assembly 26 is configured to send a neutral gear state output signal to the engine control module 24, and the neutral gear state output signal communicates the neutral gear state. The engine control module 24 is able to determine whether the transmission 19 is in neutral based on the neutral gear state output signal that the engine control module 24 receives from the sensor assembly 26. The engine control module 24 starts the engine 21 if the transmission 19 is in neutral, but the engine control module 24 contains a control logic that prevents the vehicle engine 21 from being started if the neutral gear state indicates that the transmission 19 is not in neutral. Thus, if the engine control module 24 has received a signal from the sensor assembly 26 indicating the transmission 19 is not in neutral, the engine control module 24 does not start the engine 21; in other words, the engine control module 24 prevents itself from starting the engine 21 or prevents the engine 21 from being started. Therefore, if the transmission 19 is in a forward or reverse gear, and not in neutral, the engine 21 will not be started, and the vehicle will not be inadvertently launched without a driver behind the wheel.

The remote start vehicle system 20 may also include a body control module (BCM) 28. In the illustrated variation, the transmitter 22 is configured to send an original remote start request signal to the body control module 28 when the transmitter 22 is activated by a user. In an alternative embodiment, however, the separate body control module 28 could be omitted and the transmitter 22 could send the original remote start request signal straight to the engine control module 24.

The body control module 28 is in communication with a receiver that receives the original remote start request signal from the transmitter 22. In one variation, upon receiving the original remote start request signal, the body control module 28 sends a remote start request and a crank request to the engine control module 24. In response to the remote start request and crank request that the engine control module 24 receives from the body control module 28, the engine control module 24 starts the engine 21 of the vehicle, unless the transmission 19 is not in neutral (or another factor prevents the engine control module 24 from starting the engine 21, such as the parking brake not being applied). In one variation, the engine control module 24 requests the neutral gear state output signal from the sensor assembly 26 upon receiving the remote start request from the body control module 28. If the neutral gear state indicates that the transmission 19 is in neutral, the ECM 24 may start the engine, or is at least not prevented from doing so on the grounds of the transmission 19 not being in neutral. If, however, the transmission 19 is not in neutral, the engine control module 24 prevents the engine 21 from being started, or in other words, the engine control module 24 does not start the engine 21.

In some variations, the body control module 28 receives an original remote start request signal from the transmitter 22, and the body control module 28 processes the original remote start request signal. The body control module 28 then sends the processed remote start request signal to the engine control module 24.

The remote start vehicle system 20 may also include a parking brake indicator 30 configured to indicate whether a parking brake is applied. The parking brake indicator 30 is configured to output a parking brake state signal indicating whether the parking brake is applied. The parking brake indicator 30 may be a sensor, an electronic indicator based on a known state of whether the parking brake is applied in an electronic controller associated with the parking brake, or any other type of indicator. In the illustrated example, the parking brake indicator 30 outputs the parking brake state signal to the body control module 28, but it should be understand that the parking brake indicator 28 could communicate directly with the engine control module 24 or another intermediate controller or control module.

In some variations, the body control module 28 sends the parking brake state signal to the engine control module 24, and the engine control module 24 is configured to determine whether the parking brake is applied based on the parking brake state signal. The engine control module 24 is configured to prevent the engine 21 of the vehicle from being started if the parking brake is not applied. In other words, the engine control module 24 declines to start the vehicle engine 21 if the parking brake is not applied. Otherwise, the ECM 24 may cause the engine 21 to be started, as long as the transmission 19 is in neutral. Therefore, the system 20 provides safety by not allowing the engine 21 of the vehicle to be started and the vehicle to be launched or to roll when there is no driver behind the steering wheel, because the system 20 prevents the vehicle engine 21 from being started remotely when the manual transmission 19 (which could be a manual transmission, AMT, or DCT) is not in neutral and/or when the parking brake is not applied.

Thus, the system 20 only allows the engine 21 of the vehicle to be started when the transmission 19 is in neutral and when the parking brake is applied. (In some variations, however, the parking brake indicator 30 is eliminated from the system, and the engine control module 24 starts the vehicle engine 21 if the transmission 19 is in neutral, regardless of whether the parking brake is applied).

In another variation, the body control module 28 receives the parking brake state signal from the parking brake indicator 30, and the body control module 28 sends the processed remote start request signal (e.g., the engine start request) to the engine control module 24 only if the parking brake state signal indicates that the parking brake is applied. Thus, the body control module 28 processes the information regarding the parking brake applied state, instead of the engine control module 24 processing such information, in this example.

Figure 2A:
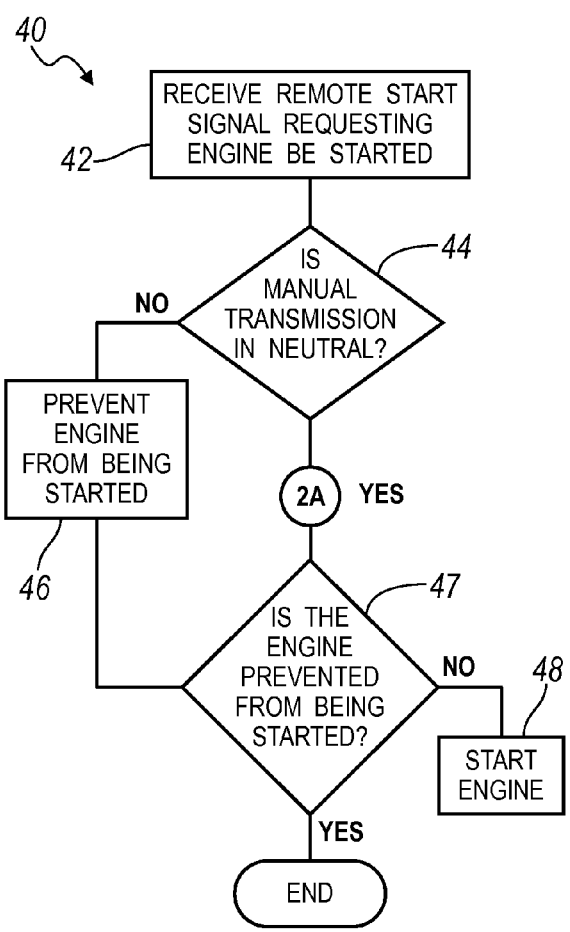
FIG. 2A is a block diagram illustrating a method of remotely starting an engine of a motor vehicle, according to the principles of the present disclosure.

Referring now to FIG. 2A, a method of remotely starting an engine 21 of a motor vehicle having a transmission 19, such as a manual transmission, AMT, or DCT, is illustrated and generally indicated at 40. The method 40 includes a step 42 of receiving a remote start signal requesting that the vehicle engine 21 be started. The method includes a control logic step 44 of determining whether the transmission 19 is in neutral. If the transmission 19 is not in neutral, the method 40 includes a step 46 of preventing the vehicle engine 21 from being started. If the vehicle engine 21 is not prevented from being started, the method 40 includes a step 48 starting the vehicle engine 21. Thus, if the transmission is in neutral as determined in step 44, the method 40 may proceed to a step 47 of determining whether the engine 21 is prevented from being started. If the engine 21 is prevented from being started, the method 40 ends until a remote start signal is received again. In the alternative, the method 40 could send a feedback signal to the user indicating that the engine 21 is prevented from being started, or indicating a reason that the engine 21 is not being started. If the engine 21 is not prevented from being started, as inquired in step 47, then the method 40 proceeds to step 48 and starts the engine 21.

The step 44 of determining whether the transmission is in neutral may include sensing a gear position with one of a gear absolute position (GAP) sensor and a neutral gear sensor (NGS). The step 42 of receiving the remote start signal may includes receiving the remote start signal from a transmitter 22 that is located outside of the vehicle, as explained above. In addition, any other details discussed elsewhere herein may be used in the method 40.

Figure 2B:
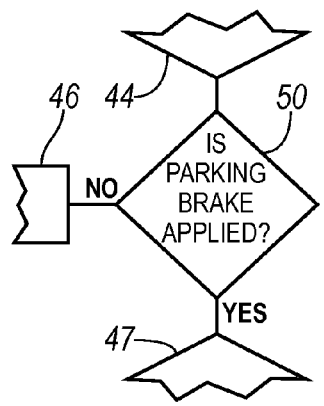
FIG. 2B is a block diagram illustrating a variation of the method of FIG. 2A at the point 2A of FIG. 2A, in accordance with the principles of the present disclosure.

In one variation, the method 40 includes a step of determining whether a parking brake is applied, and a step of preventing the vehicle engine 21 from being started if the parking brake is not applied. Thus, referring to FIG. 2B, an optional step 50 of determining whether the parking brake is applied is illustrated. If the parking brake is applied, the method 40 proceeds to step 47, as hereinbefore described, but if the parking brake is not applied, the method 40 proceeds to step 46, as hereinbefore described. Therefore, in the embodiment of FIG. 2B, the method 40 prevents the engine 21 from being started if either the transmission 19 is not in neutral or the parking brake is not applied.

Figure 3:
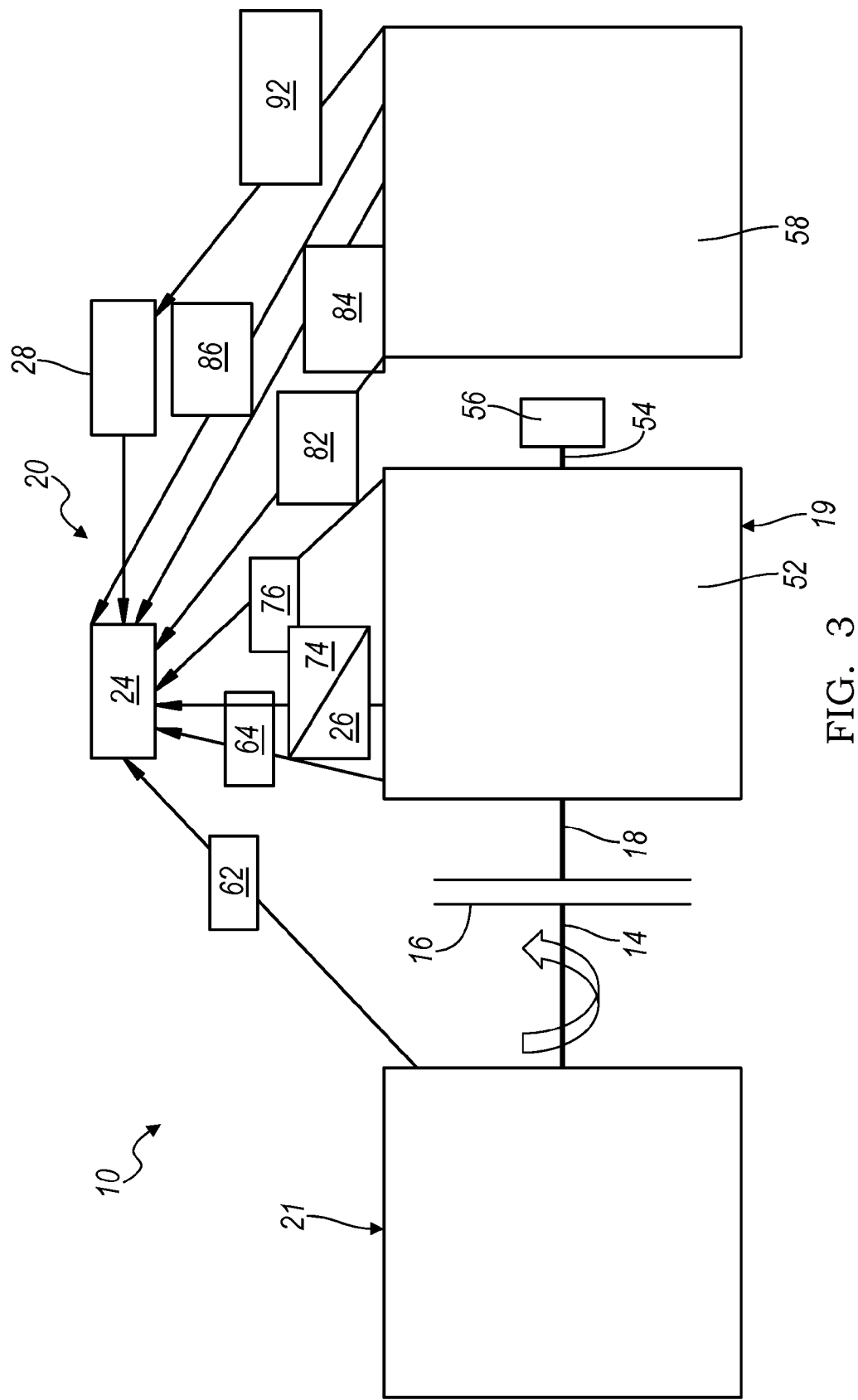
FIG. 3 is a block diagram of electrical, electronic and mechanical components of a motor vehicle having a manual transmission and equipped with the system of the FIG. 1, according to the principles of the present disclosure.

Referring now to FIG. 3, electrical, electronic and mechanical components of a motor vehicle having a manual transmission 19 is illustrated and generally designated by the reference number 10. Additional details of the system 20 are illustrated in FIG. 3, which illustrates an embodiment, though other variations are also possible. The components 10 include a prime mover 21 which may be a gasoline, Diesel or flex fuel engine, or a hybrid or electric power plant. Thus, the engine 21 described above can be any type of prime mover. The prime mover 21 includes an output shaft 14 which drives a main friction clutch 16 which is typically, though not necessarily, engaged and disengaged by the vehicle operator (not illustrated). The main clutch 16 selectively provides drive torque to an input shaft 18 of the manual transmission 19.

The manual transmission 19 may be conventional, or it may be an AMT or DCT, and includes a housing 52 as well as shafts, gears and synchronizer clutches (all not illustrated) which cooperatively provide, for example, four, five, six or more forward speeds or gear ratios and reverse. The transmission 19 includes an output shaft 54 which is coupled to a final drive assembly 56 which may include, for example, a propshaft, a differential assembly and a pair of drive axles. A driver interface 58 generally includes those controls and devices under the control of and operated by the vehicle operator (not illustrated).

The components 10 also include a plurality of electric and electronic sensors which provide real time data to the engine control module (ECM) 24. For example, an electronic sensor (tachometer) 62 disposed in the prime mover 12 provides a signal representing the current speed of the output shaft 14 of the prime mover 12. A transmission input speed sensor (TISS) 64 senses the instantaneous speed of the input shaft 18 of the manual transmission 19. A transmission output speed sensor (TOSS) 76 senses the instantaneous speed of the output shaft 54 of the manual transmission 19.

The gear absolute shift position sensor assembly 26 includes an application specific integrated circuit 74, the data output of which indicates the current position of a shift lever 102. A clutch position sensor 82 senses the position of the main clutch 16. A throttle position sensor 84 senses the instantaneous position of a throttle pedal (not illustrated). A brake pedal position sensor 86 sense the position of a brake pedal (also not illustrated). The body control module (BCM) 28 receives data from one or more control switches 92 and includes a data output to the engine control module 24.

Figure 4:
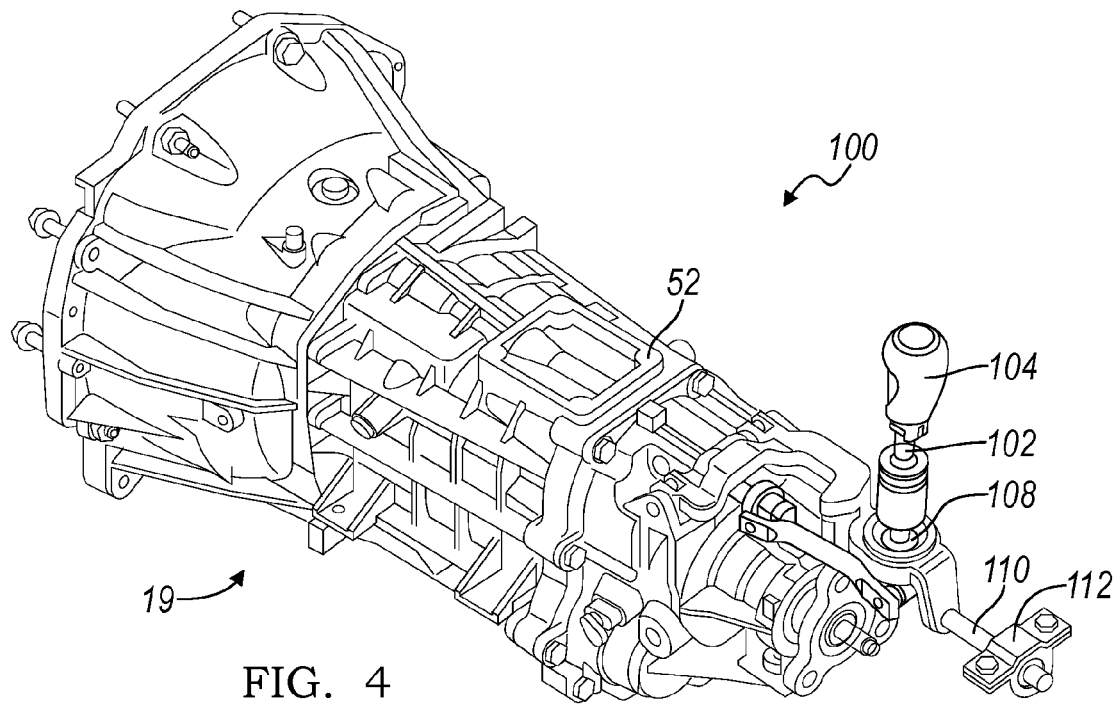
FIG. 4 is a perspective view of a portion of a manual transmission including a shift linkage incorporating the system of FIG. 1, in accordance with the principles of the present disclosure.
Figure 5:
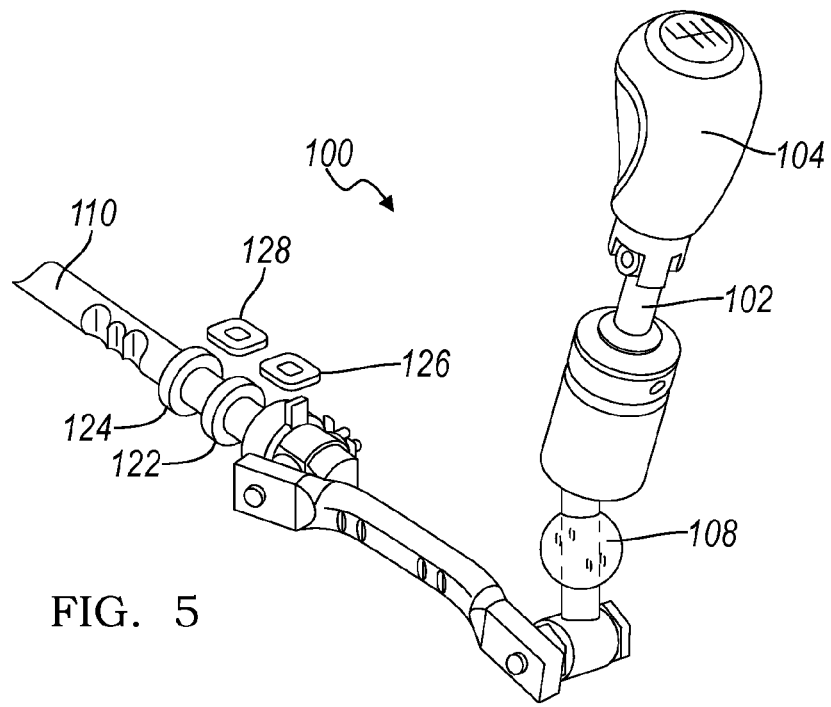
FIG. 5 is an enlarged view of a manual transmission shift linkage incorporating the system of FIG. 1, according to the principles of the present disclosure.

Referring now to FIGS. 4, 5 and 6, attached to the exterior of the housing 52 of the manual transmission 19 is a shift linkage 100. The shift linkage 100 includes a shift lever 102 which terminates in a shift ball or handle 104 that is engaged and manipulated by the vehicle operator. The shift lever 102 is moveable through a virtual or actual shift gate or "H" pattern 126, illustrated in FIG. 6, which facilitates selection of, separates and creates tactile feedback for six forward gears or speed ratios and reverse. It should be understood, however, that the manual transmission 19 may incorporate and provide more or fewer gears or speed ratios. The shift lever 102 is disposed in a ball pivot 108 and coupled to a longitudinally oriented shaft 110 which is supported by various mounting members or brackets and bearings 112 which allow it to translate fore and aft and rotate about its axis.

Referring now to FIGS. 5, 7A, 7B and 7C, the gear absolute position sensor assembly 26 includes a first arc magnet or ring 122 and a spaced apart second arc magnet or ring 124, both secured to the longitudinally oriented shaft 110. In the neutral position of the shift linkage 100 illustrated in FIG. 7A, a first Hall effect sensor 126 is disposed proximate, but preferably not in contact with the first arc magnet or ring 122 and a second Hall effect sensor 128 is disposed proximate, but preferably not in contact with, the second arc magnet or ring 124. The outputs of the first Hall Effect sensor 126 and the second Hall Effect sensor 128 are fed directly to the application specific integrated circuit 74 which may be formed and assembled integrally with the sensors 126 and 128 into a unitary device. Alternatively, a single arc magnet or ring and a proximate single three dimensional (3D) Hall effect sensor may be utilized in place of the two rings 122 and 124 and the two one dimensional (1D) Hall effect sensors 126 and 128.

It will be appreciated that the first and second arc magnets or rings 122 and 124 and the associated Hall effect sensors 126 and 128 may be mounted within the transmission housing 52, through the transmission housing 52 or at any convenient location where the rings 122 and 124 may be attached to the shaft 110 and the sensors 126 and 128 mounted proximately. For example, they may be mounted within or near the bracket or bearing 112 illustrated in FIG. 4. As an alternative to Hall effect sensors, anisotropic magneto resistance (AMR), giant magneto resistance (GMR), permanent magnet linear contactless displacement (PLOD), linear variable displacement transformer (LVDT), magneto elastic (ME) or magneto inductive (MI) sensors may be utilized.

FIG. 7B illustrates the position of the shaft 110 when the shift lever 102 is in a forward position in the shift gate 106, selecting, for example, reverse, first, third or fifth gears. Here, the first arc magnet or ring 122 is remote or spaced from both the first and the second Hall Effect sensors 126 and 128 and the second arc magnet or ring 124 is in proximate, sensed relationship with the first Hall Effect sensor 126. Rotation of the shaft 110 and the second arc magnet or ring 124 adjacent the first Hall effect sensor 126 changes or modulates the magnetic field strength sensed by the first Hall effect sensor 126 and this information is utilized by the application specific integrated circuit 74 to provide a data signal indicating the absolute, current gear shift position, as described more fully below.

FIG. 7C illustrates the position of the shaft 110 when the shift lever 102 is in a rearward position in the shift gate 106, selecting, for example, second, fourth or sixth gears. Here, the second arc magnet or ring 124 is remote or spaced from both the first and the second Hall Effect sensors 126 and 128 and the first arc magnet or ring 122 is in proximate, sensed relationship with the second Hall Effect sensor 128. Rotation of the shaft 110 and the first arc magnet or ring 122 adjacent the second Hall effect sensor 128 changes or modulates the magnetic field strength sensed by the second Hall effect sensor 128 and this information is utilized by the application specific integrated circuit 74 to provide a data signal indicating the absolute, current gear shift position, as described more fully below.

Referring now to FIG. 8, the actual forward and rearward translations and clockwise and counterclockwise rotations of the shaft 110 relative to the neutral position are presented for each of the six forward speed or gear ratio positions and reverse. It should be appreciated that the translations and rotations presented in FIG. 8 are illustrative and exemplary only and that such numerical values may vary and be adjusted widely to accommodate various transmission sizes, configurations and designs including those having a different number of gears. It should also be appreciated that although the shift linkage 100 described herein functions with first selection (lateral) motion of the shift lever 102 followed by shift (longitudinal) motion (and first rotational motion of the shaft 110 and the magnet rings 122 and 124 and then longitudinal motion), the invention also encompasses a shift linkage 100 in which the shaft 110 and the magnet rings 122 and 124 first move longitudinally and then rotate in response to motion of the shift lever 102.

Referring now to FIG. 9A, a diagram corresponding to the shift gate or "H" pattern 106 illustrated in FIG. 6, presents the PWM duty cycle output of the application specific integrated circuit 74 in percent for each of the Hall Effect sensors 126 and 128 as a function of the location of the shift lever 102 and the shaft 110. Note, first of all, that for all neutral positions, the duty cycle output values for both the sensors 126 and 128 are identical, thus providing a useful integrity check on system and sensor operation. Second of all, in both forward positions in the shift gate pattern 106, selecting, for example, reverse, first, third or fifth gears, as illustrated if FIG. 7B, and rearward positions in the shift gate pattern 106, selecting, for example, second, fourth and sixth gears, as illustrated in FIG. 7C, one of the outputs of the Hall effect sensors 126 and 128 is always zero; the second Hall effect sensor 128 in the first instance and the first Hall effect sensor 126 in the second instance.

Referring now to FIG. 9B, a graph illustrates the actual continuous state output (PWM duty cycle in percent) of the application specific integrated circuit 74 from the first Hall effect sensor 126 along the horizontal (X) axis and the output of the application specific integrated circuit 74 from the second Hall effect sensor 128 along the vertical (Y) axis as the shaft 110 and the shift lever 102 move through the various positions of the shift gate pattern 106 while selecting one of the available gears or speed ratios. From this graph, as well as the data of FIG. 9A, it will be appreciated that not only each gear selection position has a unique numerical value or signature but also that as the shift lever 102 is moved and the shaft 110 is translated and rotated, the outputs of the Hall effect sensors 126 and 128 and the application specific integrated circuit 74 provide a continuously varying, essentially analog, signal that permits the engine control module 24 or other, similar device to infer not only the present location of the shift lever 102 and the shaft 110, but also their direction of motion and the speed of such motion.

Accordingly, the sensor assembly 26, as described above in FIGS. 5, 7A, 7B, 7C, 9A, and 9B may be used to detect whether the transmission 19 has been left in a neutral gear state, and if so, the ECM 24 will start the engine 21 upon request from the remote start transmitter 22.

The description of the invention is merely exemplary in nature and variations that do not depart from the gist of the invention are intended to be within the scope of the invention. Such variations are not to be regarded as a departure from the spirit and scope of the invention.

What is claimed is:

1. A remote start vehicle system for starting an engine of a vehicle having a transmission, the remote start vehicle system comprising:
- a remote start requester configured to request that the engine be started, the remote start requester operable to request that the engine be started when the remote start requester is located outside of the vehicle;
- an engine control module configured to cause the engine to be started;
- a body control module configured to receive the request from the remote start requester that the engine be started; and
- a gear shift assembly configured to actuate a plurality of torque transmitting mechanisms of the transmission, the gear shift assembly including a shift lever, a first gear shift linkage, and a second gear shift linkage, and wherein the gear shift lever has a first end and a second end, the first end is manipulated by an operator of the vehicle, the second end is pivotably connected with the first gear shift linkage such that the predominately vertically mounted shift lever actuates the longitudinally oriented first gear shift linkage fore and aft and rotates about a longitudinal axis, the first gear shift linkage is pivotably connected to the second gear shift linkage, and the second gear shift linkage is enclosed by a housing of the transmission;
- a sensor assembly configured to sense a neutral gear state of the transmission and to communicate the neutral gear state to the engine control module, the neutral gear state indicating whether the transmission is in neutral, the sensor assembly having a first and a second arc magnet and a first and a second sensor, the first and second arc magnets disposed on the second gear shift linkage, the first sensor disposed proximate the first arc magnet, and the second sensor disposed proximate the second arc magnet,
- wherein the engine control module is configured to cause the engine to be started upon the request of the remote start requester if the transmission is in neutral, the engine control module being further configured to prevent the engine from being started if the transmission is not in neutral.

2. The remote start vehicle system of claim 1, the sensor assembly being configured to send a neutral gear state output signal to the engine control module, the neutral gear state output signal communicating the neutral gear state.

3. The remote start vehicle system of claim 2, wherein the remote start requester is a transmitter that is activatable by a user.

4. The remote start vehicle system of claim 3, further compromising a parking brake indicator configured to indicate whether a parking brake is applied, the parking brake indicator being configured to output a parking brake state signal indicating whether the parking brake is applied.

5. The remote start vehicle system of claim 4, wherein the body control module is further configured to determine whether the parking brake is applied based on the parking brake state signal and to prevent the engine from being started if the parking brake is not applied.

6. The remote start vehicle system of claim 5, the body control module being configured to send the processed remote start request signal to the engine control module only if the parking brake state signal indicates that the parking brake is applied.

7. The remote start vehicle system of claim 5, wherein the body control module is configured to send the parking brake state signal to the engine control module, the engine control module being configured to prevent the engine from being started if the parking brake state signal indicates that the parking brake is not applied.

8. The remote start vehicle system of claim 3, wherein first and second sensors of the sensor assembly are three dimensional Hall effect sensors.

9. The remote start vehicle system of claim 8, wherein the transmission is a manual transmission.

10. A vehicle system for remotely starting an engine of a vehicle, the vehicle system comprising:
- a manual transmission configured to regulate torque transmission from an engine, the manual transmission configured to be shifted into a plurality of gear states by a user;
- an engine control module configured to cause the engine to be started;
- a body control module configured to receive the request from the remote start requester that the engine be started;
- a gear shift assembly configured to actuate a plurality of torque transmitting mechanisms of the transmission, the gear shift assembly including a shift lever, a first gear shift linkage, and a second gear shift linkage, and wherein the gear shift lever has a first end and a second end, the first end is manipulated by an operator of the vehicle, the second end is pivotably connected with the first gear shift linkage such that the predominately vertically mounted shift lever actuates the longitudinally oriented first gear shift linkage fore and aft and rotates about a longitudinal axis, the first gear shift linkage is pivotably connected to the second gear shift linkage, and the second gear shift linkage is enclosed by a housing of the transmission;
- a sensor assembly configured to sense a neutral gear state of the transmission and to communicate the neutral gear state to the engine control module, the neutral gear state indicating whether the transmission is in neutral, the sensor assembly having a first and a second arc magnet and a first and a second sensor, the first and second arc magnets disposed on the second gear shift linkage, the first sensor disposed proximate the first arc magnet, and the second sensor disposed proximate the second arc magnet,
- a remote start request transmitter configured to request that the engine be started when the remote start request transmitter is located outside of the vehicle,
- wherein the control module is configured to cause the engine to be started upon the request of the remote start requester if the manual transmission is in neutral, the control module being further configured to prevent the engine from being started if the manual transmission is not in neutral.

11. The vehicle system of claim 10, the sensor assembly being configured to send a neutral gear state output signal to the engine control module, the neutral gear state output signal indicating the neutral gear state, the vehicle system further compromising a parking brake indicator configured to indicate whether a parking brake is applied, the parking brake indicator being configured to output a parking brake state signal to the body control module indicating whether the parking brake is applied, the vehicle system being configured to prevent the engine from being started if the parking brake is not applied.

12. The vehicle system of claim 11, wherein the transmitter is configured to send an original remote start request signal to the body control module when activated by a user, the body control module being configured to process the original remote start request signal and to send a processed remote start request signal to the engine control module.

13. The remote start vehicle system of claim 1 wherein the second gear shift linkage has at least a first, a second, and a third axial position, and wherein when the shift linkage is in the first axial position the first sensor senses the first arc magnet and the second sensor senses the second arc magnet, when the shift linkage is in the second axial position the first sensor senses the second arc magnet and the second sensor does not sense the first or the second arc magnet, and when the shift linkage is in the third axial position the first sensor does not sense the first or second arc magnet and the second sensor senses the first arc magnet.

14. The remote start vehicle system of claim 13 wherein the first axial position of the second gear shift linkage is the neutral gear state.

* * * * *